US007833507B2

(12) United States Patent
Schoubye

(10) Patent No.: US 7,833,507 B2
(45) Date of Patent: Nov. 16, 2010

(54) PROCESS FOR THE PRODUCTION OF SULPHURIC ACID

(75) Inventor: Peter Schoubye, Hørsholm (DK)

(73) Assignee: Haldor Topsøe A/S, Lyngby (DK)

(*) Notice: Subject to any disclaimer, the term of this patent is extended or adjusted under 35 U.S.C. 154(b) by 0 days.

(21) Appl. No.: 12/535,294

(22) Filed: Aug. 4, 2009

(65) Prior Publication Data

US 2010/0068127 A1    Mar. 18, 2010

(30) Foreign Application Priority Data

Sep. 12, 2008    (DK) .............................. 2008 01281

(51) Int. Cl.
  *C01B 17/69*    (2006.01)
  *C01B 17/74*    (2006.01)
(52) U.S. Cl. ........................................ 423/522
(58) Field of Classification Search .................. 423/522
  See application file for complete search history.

(56) References Cited

U.S. PATENT DOCUMENTS 3,536,446 A    10/1970  Maurer
3,607,034 A    9/1971   Henry et al.
5,130,112 A    7/1992   McAlister et al.
7,361,326 B2   4/2008   Christensen
7,704,476 B2 * 4/2010   Daum et al. ............. 423/242.1

FOREIGN PATENT DOCUMENTS

DE    195 22 927 B4    1/1997

* cited by examiner

*Primary Examiner*—Timothy C Vanoy
(74) *Attorney, Agent, or Firm*—Dickstein Shapiro LLP

(57) ABSTRACT

Process for the production of concentrated sulphuric acid and oleum from feed gases with up to 70% $SO_2+SO_3$ ($SO_x$) and a content of $H_2O$ corresponding to $H_2O/SO_3$ molar ratios up to 1.6, particularly in the range of 0.5 to 1.6 upstream an intermediate sulphuric acid condenser comprising an air recycling loop with water addition. The process of the invention minimizes power consumption of the sulphuric acid plant by reducing the consumption of cooling water and obtaining maximum possible recovery of the heat liberated in the process for production of high pressure steam for power production. Up to 99.95% of the $SO_x$ in the feed gas can be recovered as typically 98.5-99.5 wt % concentrated sulphuric acid and/ or oleum with up to 25 wt % $SO_3$.

13 Claims, 6 Drawing Sheets

PROCESS FOR THE PRODUCTION OF SULPHURIC ACID

BACKGROUND OF THE INVENTION

The present invention relates to the production of concentrated sulphuric acid and oleum from feed gases with up to 70% $SO_2+SO_3$ ($SO_x$) and a content of $H_2O$ corresponding to $H_2O/SO_3$ molar ratios of up to 1.6, particularly in the range of 0.5 to 1.6 upstream an intermediate sulphuric acid condenser. The feed gases are produced by combustion of sulphur and sulphur compounds and feed gases from wet scrubbing of $SO_2$ gases originating from roasting of metal sulphides or from thermal regeneration of spent sulphuric acid and sulphates as well as feed gas produced from combustion of flue gases rich in $H_2S$, such as flue gases with 90 vol % $H_2S$. Up to 99.95% of the $SO_x$ in the feed gas can be recovered as typically 98.5-99.5 wt % concentrated sulphuric acid and/or oleum with up to 25 wt % $SO_3$. Furthermore, the process of the invention is concerned with minimizing the power consumption of the sulphuric acid plant, minimizing the consumption of cooling water and obtaining maximum possible recovery of the heat liberated in the process for production of high pressure steam for power production. It is a further concern of the process of the invention to avoid corrosion by hot sulphuric acid at any concentrations by i.a. using air cooled glass tubes in the intermediate and final sulphuric acid condensing stages of the process.

It has been known for many years to produce concentrated sulphuric acid from strong $SO_2$-gases containing up to 50 vol % $SO_2$ with $SO_2$-conversions of up to 99.9% or more by two-step catalytic $SO_2$-conversion with intermediate absorption of $SO_3$ or condensation of $H_2SO_4$ in both an intermediate and in a final absorption or condensation steps. In principle, $SO_3$ in the gas phase is transferred to the liquid phase by absorption of the $SO_3$ in the liquid phase, while $H_2SO_4$ vapour is transferred to liquid phase by condensation in which the gas is cooled to below its $H_2SO_4$ dew point either by direct contact with circulating acid used as the coolant, or in falling film condensers in which the gas is cooled to below its dew point and the acid is condensed on surfaces of air cooled glass tubes. In known processes, except the one described in our U.S. Pat. No. 7,361,326, both absorption or condensation steps take place in packed towers or other types of scrubbers cooled by circulating sulphuric acid being cooled by cooling water in acid coolers. The large amount of heat liberated in the absorption or condensation towers is usually lost to cooling water.

Some patents such as U.S. Pat. No. 5,130,112 describe how to utilize some or all of the heat of cooling the circulating acid for production of low pressure steam or heating of water but such heat exchangers must be made of highly acid resistant alloys which are expensive and only corrosion resistant when operated below 220-240° C. and with acid strengths above 98.5-99 wt % $H_2SO_4$.

German patent DE 19522927 B4 describes a process in which a gas with $H_2O/SO_3$ molar ratio of 0.9-1.1 is cooled in an intermediate condenser from above its $H_2SO4$ dew point to a temperature below 160° C. in a heat exchanger in which the gas and the condensate are cooled by flowing downwards across bundles of boiler tubes carrying boiler feed water and/or boiling water passing upwards in the tube bundles counter current to the gas and condensate. The applicability of this system is strongly limited by availability of sufficiently acid resistant alloys for the boiler tubes.

Our U.S. Pat. No. 7,361,326 discloses a double condensation process for production of concentrated sulphuric acid from feed gases with up to 30% $SO_2$ and $H_2O/SO_2$ ratio above about 1. In the first step of the process, most of the $SO_2$ is converted to $SO_3$ where after the gas is passed to an intermediate condenser in which $SO_3$ and $H_2SO_4$ vapour is condensed as concentrated sulphuric acid either in a packed tower cooled by circulating acid or in vertical, air cooled glass tubes with either up flow or downflow of the gas in the tubes. The latter is mentioned as an option to avoid flooding at high gas velocities but is said to convey the disadvantage that it produces sulphuric acid of low concentration (70-85 wt %), thus requiring a subsequent concentration stage, such as a packed tower to reach the desired sulphuric acid concentration of 98 wt % or above. The exit gas from the intermediate condenser passes through a second $SO_2$ conversion step and subsequently to a final wet condensing stage under the addition of particles. This patent is not concerned with utilisation of the heat released in the intermediate condenser, which in all the examples of the patent is transferred to circulating sulphuric acid and lost to cooling water.

It is therefore an object of the present invention to overcome the disadvantages of prior art processes, in particular to provide an improved double condensation process for production of highly concentrated sulphuric acid with up to 99.95% $SO_2$-conversion and with improved utilization of the heat released in the intermediate condenser, more particularly with recovery of up to 96% of all heat released in the process for production of super heated high pressure steam for power production with minimal risk of corrosion of the heat exchangers and the sulphuric acid condensers.

These and other objects are solved by the invention.

SUMMARY OF THE INVENTION

Accordingly, the invention is a process for the production of sulphuric acid and/or oleum comprising the steps of:
(a) producing a feed gas containing 5-50 mol % of $SO_2$ and a molar concentration of $H_2O$ being 50-150% of the molar concentration of $SO_2$;
(b) passing the feed gas through a first $SO_2$-conversion step in which $SO_2$ is oxidized to $SO_3$ in one or more catalyst beds;
(c) cooling the $SO_3$-containing gas from said first $SO_2$-conversion step to a temperature 0-100° C. above the sulphuric acid dew point of the gas;
(d) passing the gas to an intermediate sulphuric acid condensing stage wherein the $SO_3$-containing gas is cooled and sulphuric acid is condensed in air cooled tubes in which the $SO_3$-gas flows downwards while the cooling air flows counter currently upwards the intermediate condenser and in which said air is provided from air recycling loop adapted to said intermediate condenser, and withdrawing from the bottom of the intermediate condenser a stream of condensed sulphuric acid or oleum, and a gas stream containing unconverted $SO_2$ and uncondensed $SO_3$ and $H_2SO_4$;
(e) providing water and oxygen to the gas stream from the intermediate condenser containing unconverted $SO_2$ and uncondensed $SO_3$ and $H_2SO_4$ by adding to this gas stream air withdrawn from said air recycling loop, in which the air recycling loop comprises:
(e1) cooling of the air,
(e2) adding water to the air by evaporating water in a humidifier,
(e3) providing air to the air recycling loop;
(e4) heating the air of step (e2) and (e3) by passing the air through the intermediate condenser,
(e5) withdrawing a portion of air which has been heated according to step (e4) and adding this air to said gas stream from the intermediate condenser containing unconverted $SO_2$ and uncondensed $SO_3$ and $H_2SO_4$;

(f) reheating the resulting gas stream from step (e) and passing this gas to a second $SO_2$-conversion step in which remaining $SO_2$ is oxidized to $SO_3$ in one or more catalyst beds, cooling the gas to a temperature 0-100° C. above its $H_2SO_4$ dew point and subsequently passing the gas to a final condensing stage in which the remaining sulphuric acid is condensed by cooling of said gas in a final condenser containing air-cooled vertical glass tubes in which the gas flows upwards while the air flows counter-currently downwards, and withdrawing from said final condenser a stream of sulphuric acid;

(g) providing in the gas, prior to or after its cooling to a temperature 0-100° C. above its $H_2SO_4$ dew point according to step (f), a content of $10^{10}$ to $10^{13}$ solid particles per $Nm^3$ per vol % $SO_3$, calculated under the assumption that $SO_3$ is not hydrated to $H_2SO_4$.

In a preferred embodiment of the invention, in the intermediate condensing stage of step (d) the $SO_3$-containing gas is cooled by: i) passing the gas through vertical, air cooled glass tubes in which the $SO_3$-gas flows inside the tubes while the cooling air flows counter currently upwards on the shell side of the intermediate condenser, or ii) passing the gas on the outside of horizontal glass tubes in counter-current cross-flow with air passing inside said tubes.

Preferably, the vertical, air cooled glass tubes may be equipped with inside glass spirals in order to increase heat transfer coefficient and improve precipitation of condensate on the tube wall.

In step (e4) of the air recycling loop of the intermediate condenser the air is preferably heated to a temperature 0-15° C. below the $H_2SO_4$ dew point of the inlet $SO_3$-gas when the temperature of said gas stream is approximately 30° C. above said dew point. We have found that the content of $H_2SO_4$ mist in the gas withdrawn from the intermediate condenser will increase by heating the air to temperatures above said range of 0-15° C., in particular in the range 16-25° C. below of the $H_2SO_4$ dew point of the inlet gas.

The air recycling loop of the intermediate condenser may further comprise withdrawal from the loop of hot humid air used for the production or preparation of the feed gas. This is particularly advantageous for the process, as hot air containing water from the air recycling loop is directly integrated within the process. Thus, in one embodiment of the invention the production of the feed gas of step (a) comprises withdrawing from the air recycling loop of the intermediate condenser a stream of hot air containing water and contacting this stream with a sulphur containing stream, in which said sulphur containing stream is selected from a feedstock containing elementary sulphur, and a flue gas obtained from the scrubbing of $SO_2$ containing gas originating from the roasting of metal sulphides or from thermal regeneration of spent sulphuric acid and sulphates. Thus, the sulphur containing stream may be a feedstock containing elementary sulphur which is subjected to combustion and in which the combustion air consists of said humid air (hot air containing water) from the air recycling loop. Alternatively the sulphur containing gas may be a flue gas containing $SO_2$ from scrubbing of $SO_2$ gases generated during the roasting of metal sulphides or from thermal regeneration of spent sulphuric acid and sulphates; such gases are normally categorized as strong gases due to the presence of $SO_2$ in concentrations of above 5 vol %, normally 6-30 vol or even up to 50 vol %. Accordingly, humid air from the air recycling loop of the intermediate condenser serves to adjust the water content of the feed gas used in the process in order to obtain the required $H_2O/SO_3$ molar ratio in the gas passed to the intermediate condenser, as it will be described below. The water content of such humid air withdrawn from the air recycling loop can be in the range 5 to 25 vol %, depending on the application; it can be about 7 or 12 vol % when producing feed gas from elementary sulphur combustion, or 21 vol % when producing feed gas from highly concentrated $SO_2$-gas from scrubbing.

The sulphur containing stream used in the production of the feed gas of step (a) may be also be a gas containing $H_2S$, for instance a gas with above 80 vol %, preferably 90 vol % or more $H_2S$, which is subjected to combustion and in which the combustion air comprises air withdrawn from the final condensing stage, i.e. air which has been heated through its passage in the final condensing stage of step (f).

The air added to the air recycling loop of the intermediate condenser under (e3) may further comprise adding cooled cooling air withdrawn from the final condenser upstream of the humidifier, preferably when operating the process with feed gas $H_2O/SO_2$ ratios of 0.9-1.2 (FIGS. 2 and 4), and/or adding directly ambient air into the intermediate condenser (FIG. 3) or upstream of the intermediate condenser (outside the intermediate condenser) for closing the air balance of the process (FIGS. 1, 2 and 5).

By adding air to the recycling loop from an external source such as make-up air into the loop, preferably outside the intermediate condenser, it is possible to close the air balance of the process where this becomes necessary, in particular for the specific embodiments of the process applied for the production of sulphuric acid from sulphur combustion (FIG. 2) and the process applied for the combustion of $H_2S$-gas with excess water (FIG. 5) as described below. Air may also be added to the air recycling loop from the final condenser. Preferably, this air has been heated during its passage through the final condenser and subsequently cooled prior to entering said air recycling loop. This is particularly advantageous where the process is applied for the production of sulphuric acid from sulphur combustion (FIG. 2) where all the air for the process is supplied as cooling air from the final condenser and as make-up air from an external source such as ambient air being added into the loop outside the intermediate condenser, and where the process is applied for the treatment of strong $SO_2$-gas from scrubbing (FIG. 4) in which all the air for the process is supplied as cooling air from the final condenser; excess air is optionally vented to the atmosphere prior to entering the air recycling loop. The cooling in the intermediate condenser may also be achieved by entirely replacing air supply from the final condenser with air from an external source, such as ambient air being supplied to the air loop by passing the ambient air inside the intermediate condenser rather than adding the ambient air into the loop outside the intermediate condenser (FIG. 3).

Hence, the air recycling loop of the intermediate condenser (as used herein also simply referred as "air loop", or simply "the loop") encompasses the steps of:

cooling of the air, adding water to the loop by evaporating water in a humidifier, providing air to the loop, preferably by adding air from the cooled air of the final condenser and/or as ambient air added directly to the loop upstream of the intermediate condenser (FIGS. 1,2 and 5) or inside (FIG. 3) the intermediate condenser, withdrawing a portion of air which has been heated by passage through the intermediate condenser and adding this air to the gas stream from the intermediate condenser containing unconverted $SO_2$ and uncondensed $SO_3$ and $H_2SO_4$, and optionally, withdrawing from the loop a stream of hot air containing water and contacting this stream with a sulphur containing stream for feed gas production.

The humidifier is a water evaporator installed in the cooling air loop which makes it possible to utilize low temperature heat generated in the process for steam production thereby increasing the thermal efficiency of the process.

The content of $H_2O$ in step (a) corresponds to a nominal molar ratio of $H_2O$ to $SO_3$ ($\Psi$) in the range 0.6-1.6 in the gas passed to the intermediate condenser, calculated under the assumption that no $SO_3$ is hydrated to $H_2SO_4$. Said nominal $H_2O/SO_3$ ratio is equal to the $H_2O/SO_2$ molar ratio of the feed gas to the first $SO_2$ conversion step divided with the degree of $SO_2$-conversion achieved in the first $SO_2$ conversion step.

The adjusting of the amount of $H_2O$ of the feed gas of step (a) as described above is used to provide the right $H_2O/SO_3$ molar ratio upstream the intermediate condenser for the production of concentrated sulphuric acid or oleum from this condenser. In one embodiment the gas resulting from step (c) upstream the intermediate sulphuric acid condenser is provided with a $H_2O/SO_3$ molar ratio in the range 1.0-1.15, calculated under the assumption that $SO_3$ is not hydrated to $H_2SO_4$, i.e. calculated under the assumption that all $H_2SO_4$ is dissociated to $H_2O$ and $SO_3$. Such molar ratio enables the condensation of sulphuric acid of 98-100 wt % concentration in the intermediate condenser.

In another embodiment the gas resulting from step (c) upstream the intermediate sulphuric acid condenser is provided with a $H_2O/SO_3$ molar ratio in the range of 0.5-0.9, more preferably 0.6-0.8, calculated under the assumption that $SO_3$ is not hydrated to $H_2SO_4$. This enables condensation of oleum with up to about 30 wt % $SO_3$ from the intermediate condenser.

In yet another embodiment the gas resulting from step (c) upstream the intermediate sulphuric acid condenser has a $H_2O/SO_3$ molar ratio in the range 1.15-1.50 of the gas entering the intermediate condenser calculated under the assumption that $SO_3$ is not hydrated to $H_2SO_4$ and without adding additional $H_2O$ to the gas in the preparation of the feed gas. This corresponds more specifically to the process embodiment where the sulphur containing stream used in the production of the feed gas of step (a) is a gas containing $H_2S$ which is subjected to combustion and in which the combustion air consists of hot air from the final condensing stage.

Preferably, the upper tube sheet of the intermediate condenser is operated at temperatures above the sulphuric acid dew point (acid dew point) of the inlet gas, such as at least 20° C., preferably at least 30° C., and thereby at dry conditions. This avoids corrosion of the condenser by hot sulphuric acid at any concentration and reduces expenses significantly since the tube sheet can be made of carbon steel and other low cost materials.

The addition of particles to the gas is preferably conducted according to our U.S. Pat. Nos. 5,198,206, 6,090,364 or 7,361,326.

In the final condensing stage step (f) the gas is preferably cooled in glass tubes by ambient air flowing cross-flow downwards on the shell side of the condenser and the gas flowing inside the glass tubes. A clean gas is withdrawn from the top of the condenser and condensed sulphuric acid from the bottom of the condenser as for instance described in our U.S. Pat. No. 5,198,206.

After cooling the air from the final condenser in an air cooler, the air is added to the air recycling loop of the intermediate condenser only with feed gases with $\Psi$=0.9-1.15, such as with feed gases prepared for production of highly concentrated sulphuric acid from combustion of sulphur, as seen in FIG. 2, or from highly concentrated $SO_2$-gases, as seen in FIG. 4. When production of oleum is desired, typically with $\Psi$=0.6-0.7, only ambient air is added to the air recirculation loop while all air from the air cooler of the final condenser is vented. In order to increase the cooling efficiency of said ambient air, said ambient air is fed separately into the intermediate condenser in a separate air cooling zone below the inlet of the air of the recycling loop and added to the latter inside the intermediate condenser, as depicted in FIG. 3.

In order to produce oleum with more than 20% $SO_3$ in the intermediate condenser, the gas and condensate must be cooled to temperatures lower than normally possible with ambient air in order to achieve sufficient absorption of the $SO_3$ in the acid. Accordingly, in a further embodiment of the invention the stream of gas and condensed sulphuric acid leaving the bottom end of the air cooled glass tubes of the intermediate condenser is further cooled by passing the stream of gas and condensate across a tube bundle placed downstream the glass tubes and cooled preferably by cooling water. The tube bundle is preferably arranged inside the intermediate condenser immediately below the glass tubes. As more $SO_3$ is absorbed in the liquid (acid condensate) it is possible to produce oleum with up concentrations of up to 30 wt %.

In yet another embodiment, the feed gas of step (b) prior to passing through said first $SO_2$ conversion step contains 8-20 vol % $SO_2$ which is 92-98% converted to $SO_3$ over 2-4 catalyst beds, while the remaining $SO_2$ is about 90-99% or more converted to $SO_3$ over one catalyst bed in the second conversion step.

BRIEF DESCRIPTION OF THE DRAWINGS

The invention is now illustrated in more detail with reference to the accompanying figures.

DETAILED DESCRIPTION OF THE PREFERRED EMBODIMENTS

Figure 1:
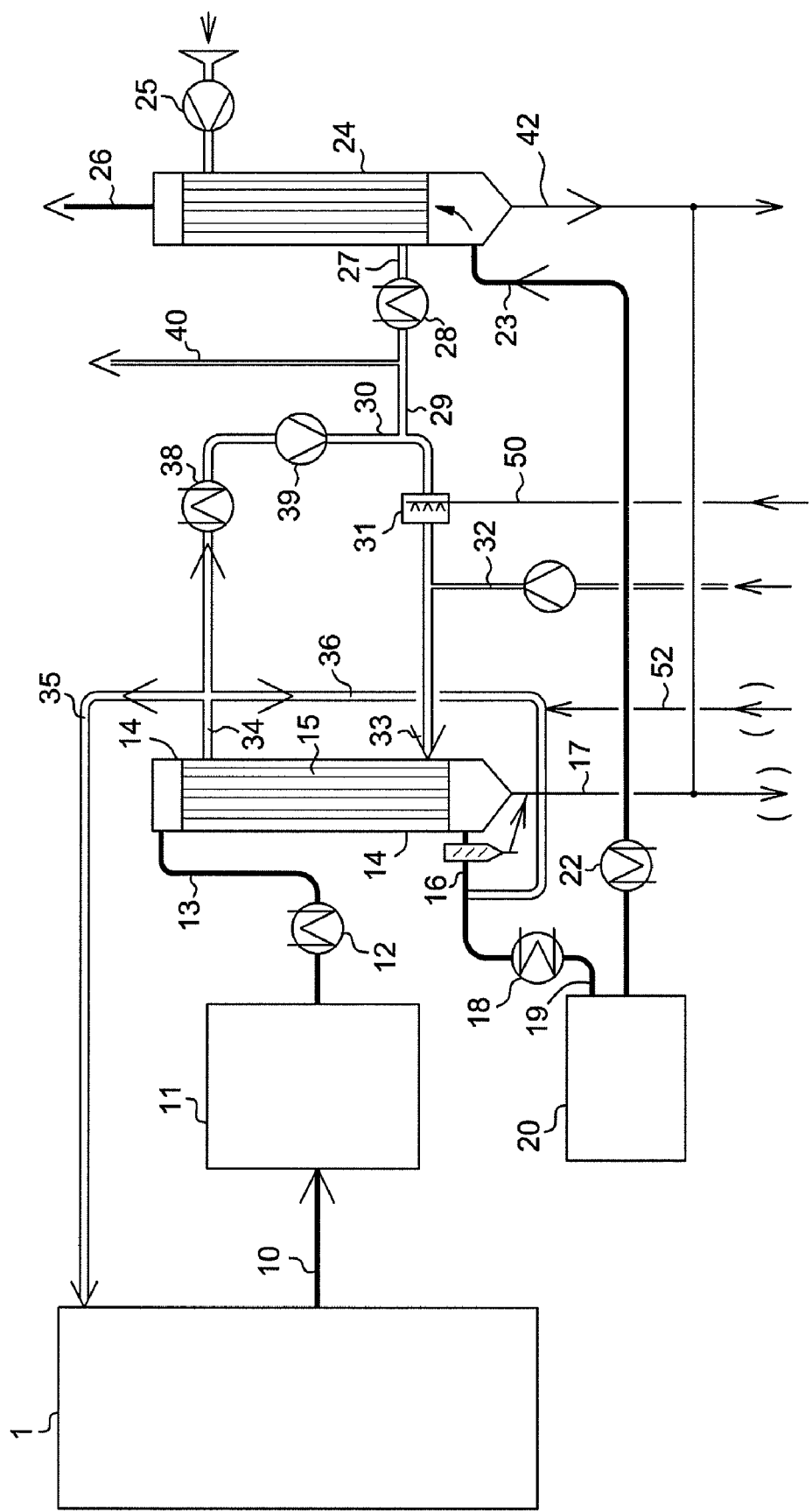
FIG. 1 shows one general embodiment of the process of the invention.
Figure 2:
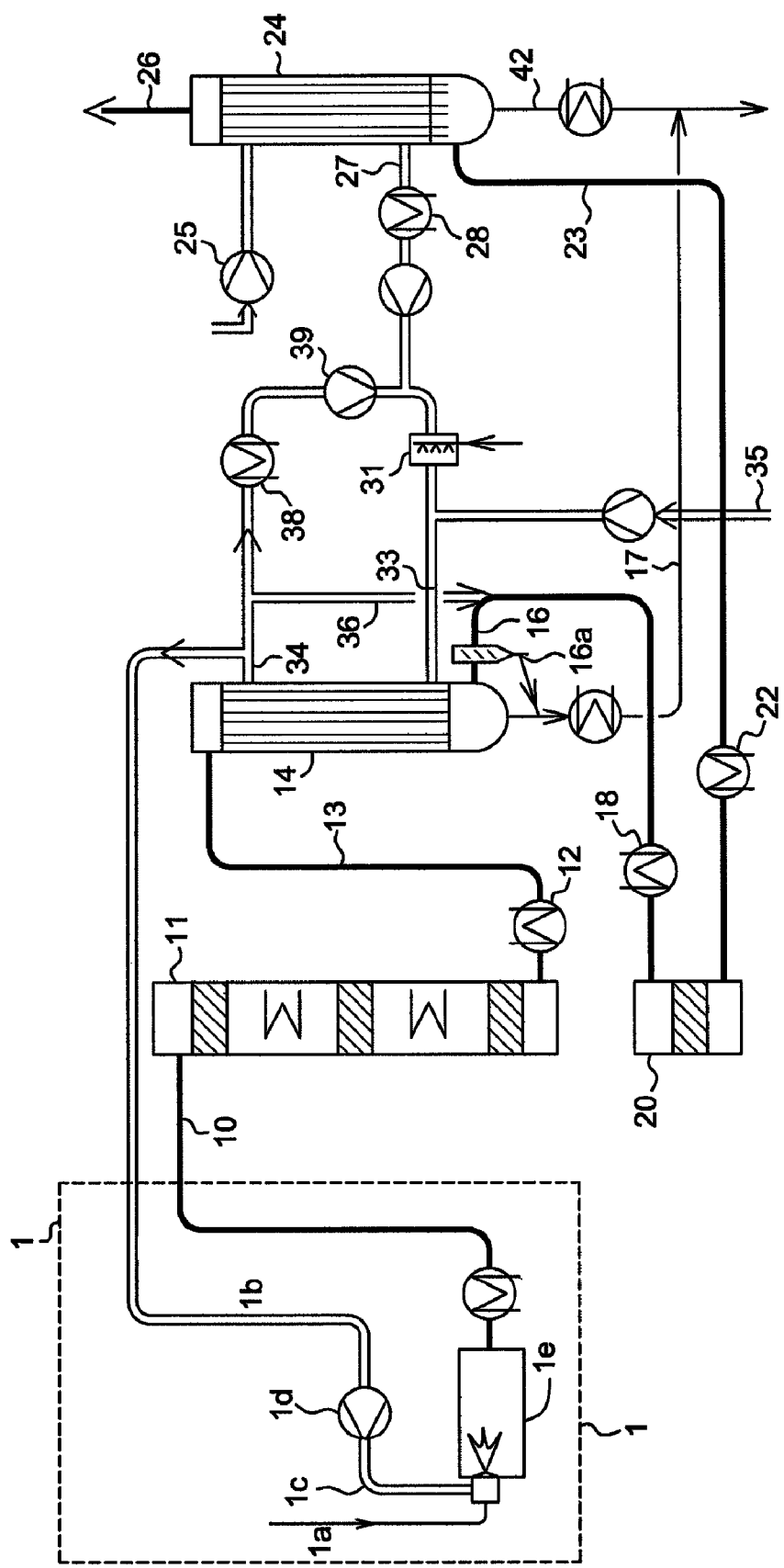
FIG. 2 shows a particular embodiment of the process of FIG. 1 for production of sulphuric acid from sulphur combustion.
Figure 3:
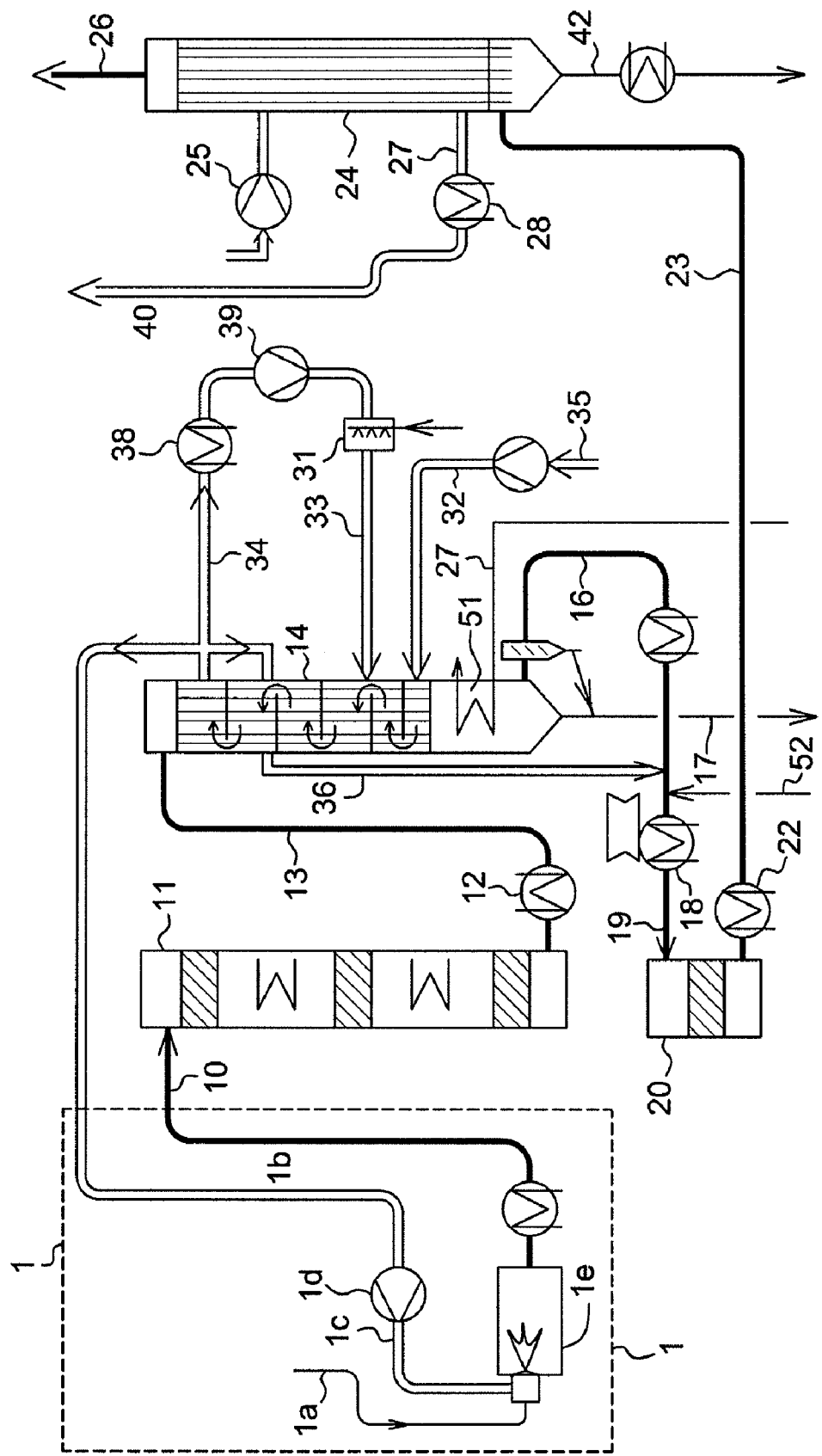
FIG. 3 shows a particular embodiment of the process of FIG. 1 for production of sulphuric acid and oleum from sulphur combustion, but in which no hot air from the final condenser is added to the air recirculation loop of the intermediate condenser.
Figure 4:
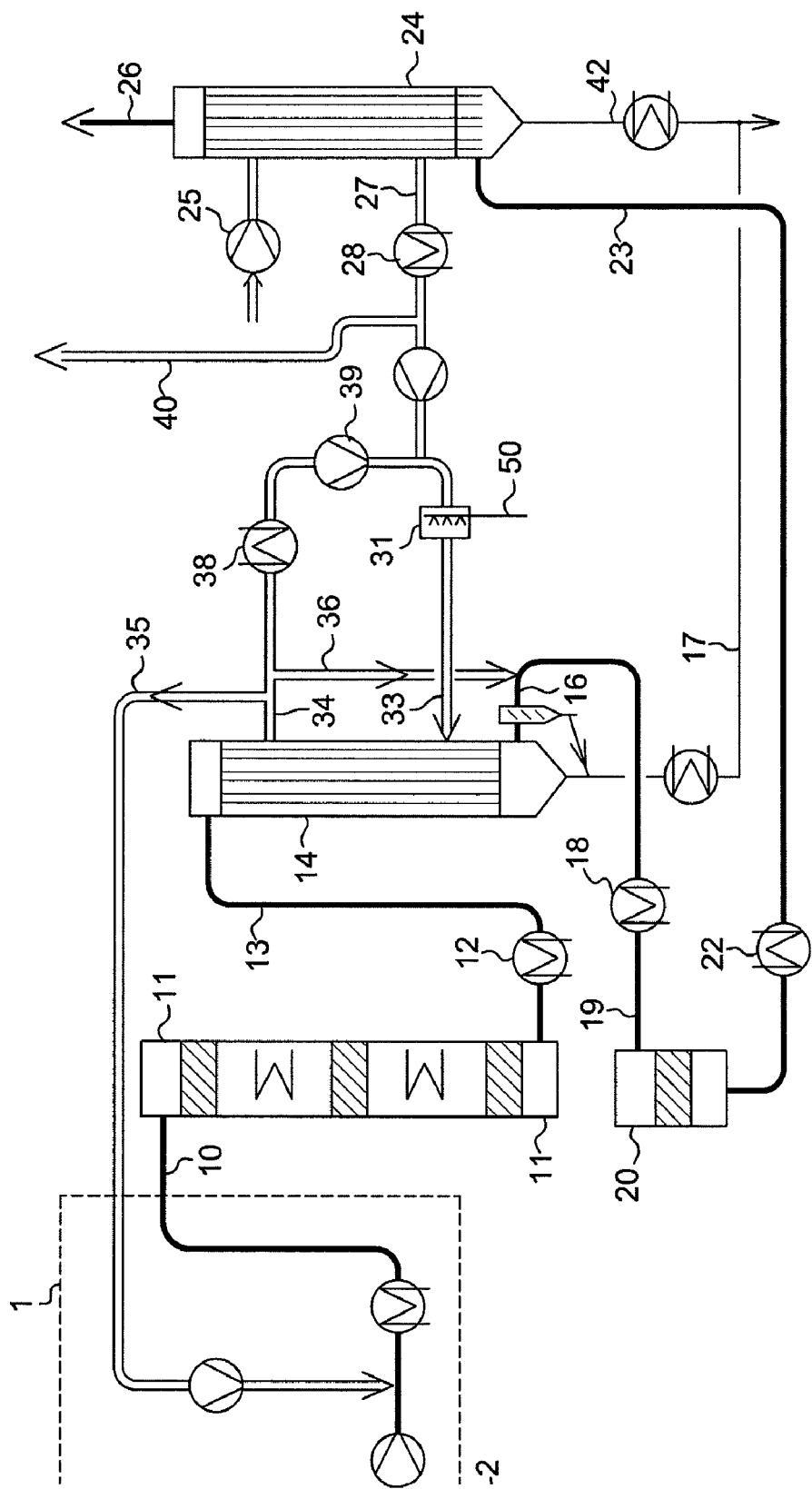
FIG. 4 shows a particular embodiment of the process of FIG. 1 for production of sulphuric acid from a flue gas containing $SO_2$ from gas scrubbing.
Figure 5:
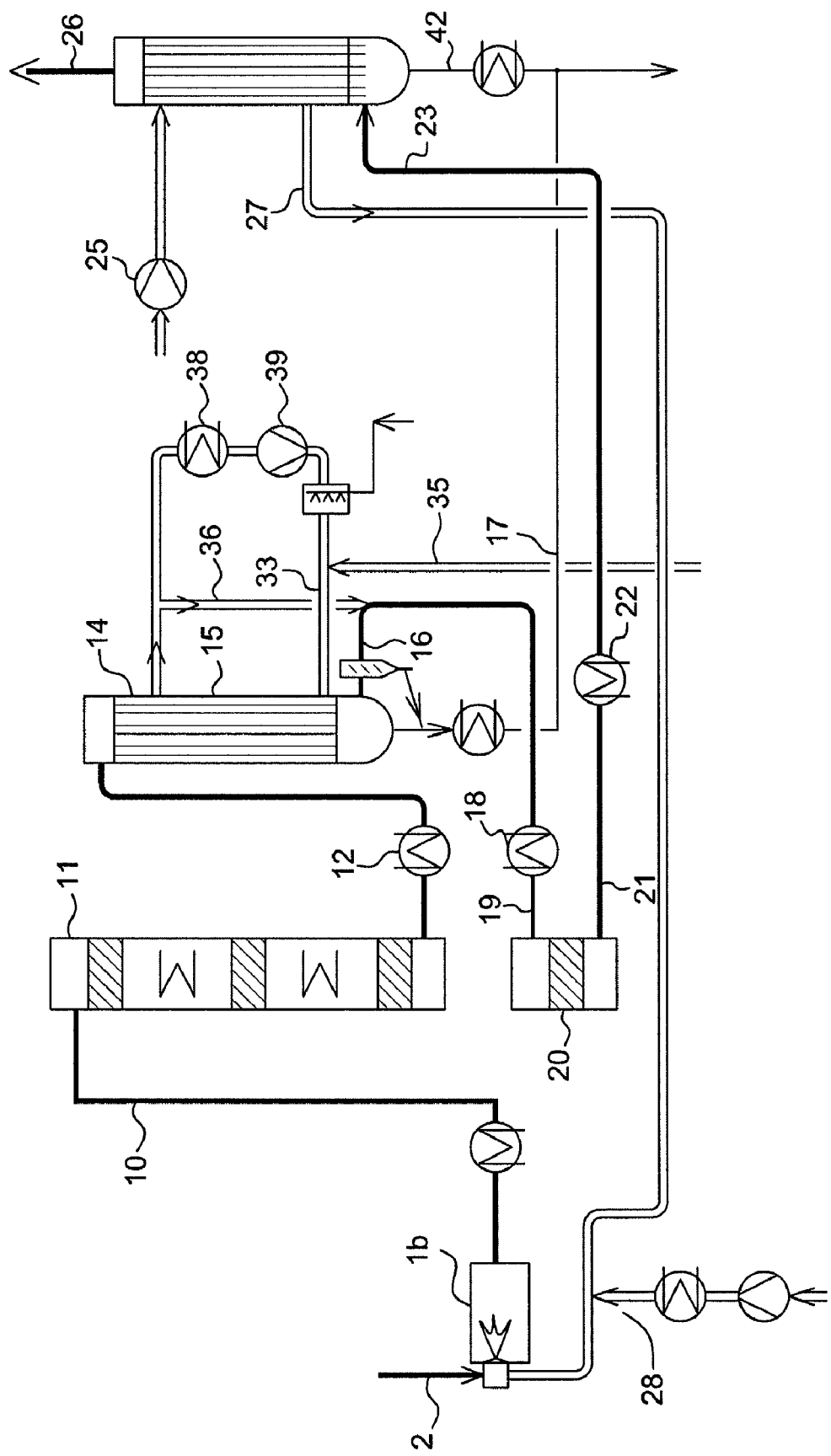
FIG. 5 shows another embodiment of the invention for the production of sulphuric acid from the combustion of $H_2S$-gas containing excess water.

The principle steps of one general embodiment of the invention are seen in FIG. 1. The process comprises the steps of passing the feed gas for the process in line 10 to a first catalytic conversion step 11 in which typically 92-98% of the $SO_2$ is converted to $SO_3$ according to the reaction $SO_2+\frac{1}{2}O_2=SO_3$ over typically three catalyst beds with inter cooling. The feed gas may origin from combustion of sulphur or sulphur components, as seen in FIGS. 2, 3 and 5, or from wet scrubbing of off gases with high concentration of $SO_2$ as seen in FIG. 4.

A process as seen in FIG. 1 is used for production of concentrated sulphuric acid, optionally combined with production of oleum, from feed gases with 6-40 vol % $SO_x$ normally prepared by combustion of sulphur and/or sulphur components or from feedstock of strong $SO_2$-gas from mineral roasting or waste acid regeneration after wet scrubbing of the strong $SO_2$-gas. $H_2O$ comprised in hot air withdrawn in line 35 from the cooling air recycling loop of the intermediate condenser 14 is added to the feed gas production section 1 in order to adjust the $H_2O/SO_x$ molar ratio at the inlet of the intermediate condenser to 1.0-1.15 or 1.0-1.2 for production of concentrated sulphuric acid or to 0.5-0.90 for condensation of oleum 17 in the intermediate condenser 14. The feed gas is passed to a first $SO_2$ oxidation step in catalytic reactor 11 in which 92-98% of the $SO_2$ in the feed gas is converted to $SO_3$ over typically three catalyst beds with inter cooling. The gas now containing $SO_2$ and $SO_3$ ($SO_x$) is cooled in the heat exchanger 12 to a gas 13 with temperature about 30° C. above its $H_2SO_4$ dew point or typically 300-330° C. upstream of the intermediate condenser 14 in which the gas is further cooled to 100-180° C. and the $H_2SO_4$ is condensed by down-flow of the gas in air cooled glass tubes. When producing oleum with for instance 25 wt % $SO_3$, the gas is further cooled to about 40° C., preferably in a gas cooler placed below the glass tubes in order to increase the absorption of $SO_3$ in the condensed $H_2SO_4$. The condenser exit gas in line 16 is then heated in heat exchanger 18 and additional air and excess $H_2O$ from the air recycle loop is added via line 36 to the condenser exit gas upstream of a second $SO_2$ conversion step 20, where $SO_3$ is formed according to $SO_2+\frac{1}{2}O_2=SO_3$, followed by cooling of the gas in gas cooler 22 and condensation of remaining $SO_3$ and $H_2SO_4$ of line 23 in a final sulphuric acid condenser 24 in which the gas flows upwards in air cooled glass tubes, which results in clean gas stream 26 and sulphuric acid stream 42. The air used for cooling the intermediate absorber 14 is recycled via recycle blower 39 in the air recycling loop comprising withdrawal from the loop in line 35 of hot air used for the preparation of the feed gas, withdrawal in line 36 of air added to the gas upstream of the second $SO_2$ conversion step, air cooling by passage through air cooler 38, addition in line 29 of air from the final condenser 24, adding water 50 via humidifier (e.g. evaporator) 31 in which water used for the process and for increasing the air side heat exchange efficiency is evaporated, and finally, addition of air as make-up air 32 to the air recycling loop closing the air balance of the process. The air used for cooling the final condenser 24 is passed first through blower 25 upstream the final condenser and leaves in line 27 where it is subsequently cooled in heat exchanger 28. Excess air is withdrawn in line 40. Steam 52 may be added to line 36.

Up to 99.9% of the $SO_x$ in the feed gas are normally recovered as concentrated sulphuric acid or oleum with very high energy efficiency and up to 96% of all the heat of the process is recovered as high pressure superheated steam for power generation.

Hot, humid air withdrawn in line 35 from the air recycling loop of the intermediate condenser 14 is used in the production 1 of the feed gas of line 10 in order to provide the amount of oxygen necessary to achieve the desired $SO_2$-conversion in the first $SO_2$ oxidation/conversion step 11 and to provide the amount of water necessary to achieve the desired molar $H_2O/SO_3$ molar ratio ($\Psi$) of the gas 13 entering the intermediate condenser 14, where the concentrations of $H_2O$ and $SO_3$ are the nominal concentrations calculated on the assumption that $H_2SO_4$ in the gas is completely dissociated in $H_2O$ and $SO_3$.

As described above the terms $H_2O/SO_3$ molar ratio and $\Psi$ are identical and serve to define the desired molar ratio of $H_2O$ to $SO_3$ of the gas 13 entering the intermediate condenser 14. For instance, in the process of FIG. 2 and corresponding data of Table 1, the $H_2O/SO_2$ ratio of the gas 10 entering the $SO_2$-reactor 11 is 11.8/11.276=1.0465 while the nominal $H_2O/SO_3$ ratio of the gas entering the intermediate condenser 14 is $\Psi$=1.0465/0.965=1.0866 as 96.5% $SO_2$-conversion is achieved in the 1st $SO_2$ oxidation step 11.

The $SO_3$-containing gas is cooled in the heat exchanger 12 upstream of the intermediate condenser 14 to a temperature often 30° C. above the $H_2SO_4$ dew point ($T_d$) of the gas which is usually in the range of 270-290° C. The temperature of the gas 13 after heat exchanger 12 is 310° C. As described above, this enables that the upper tube sheet is kept dry and thus it can be made of carbon steel and other low cost materials.

In the intermediate sulphuric acid condenser 14, the gas is cooled and sulphuric acid condensed in vertical, air cooled glass tubes in which the $SO_3$-gas flows downwards inside the tubes while the cooling air introduced in line 33 flows in countercurrent cross-flow upwards on the shell side of the condenser. In line 16 a gas stream containing unconverted $SO_2$ and uncondensed $SO_3$ and $H_2SO_4$ is withdrawn while in line 17a condensed acid is withdrawn from the bottom of the condenser.

Figure 6:
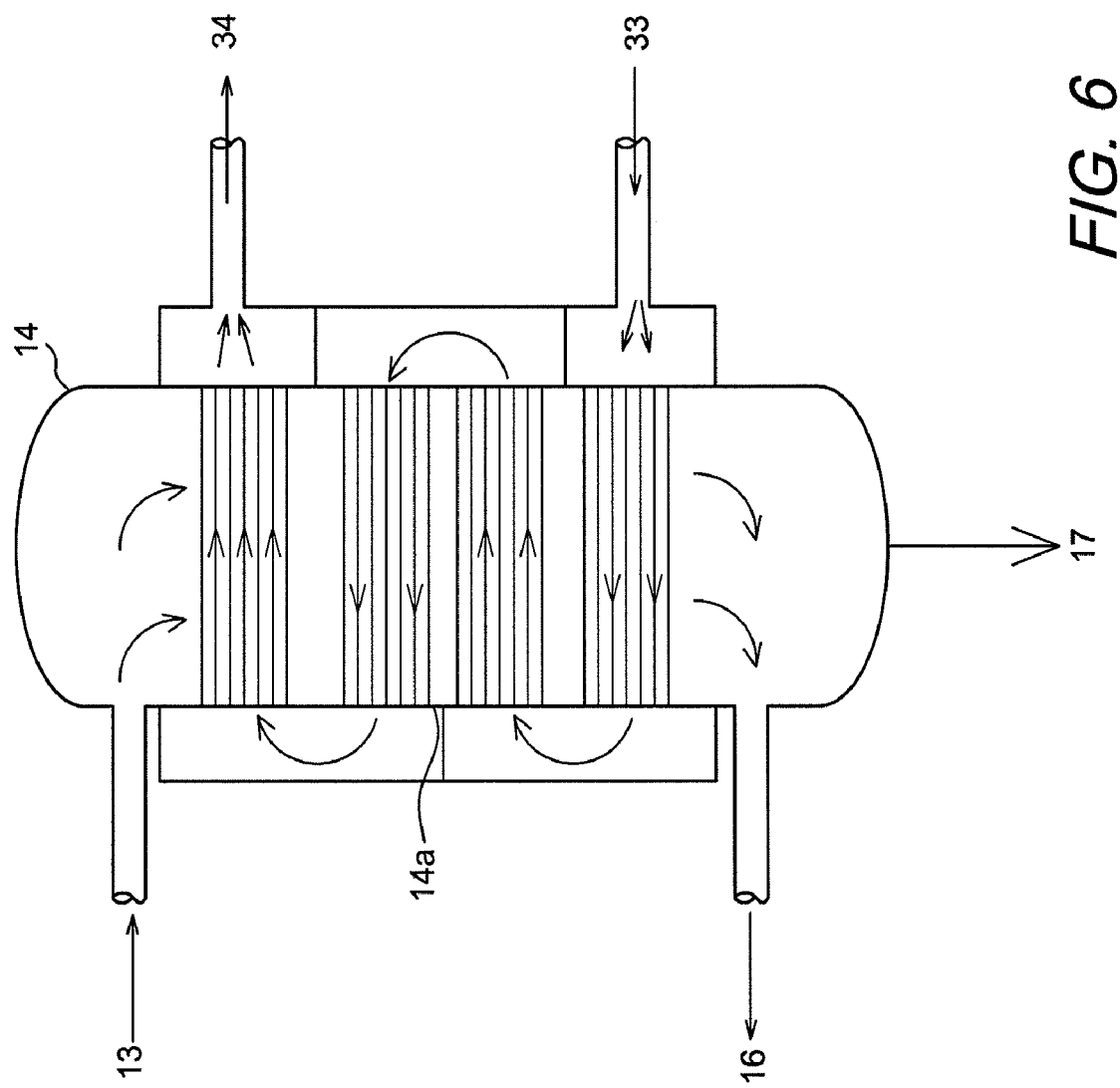
FIG. 6 is a schematic of a particular embodiment of the intermediate condenser with air flowing inside the tubes and gas containing $SO_3$ outside the tubes in downward flow.

Turning now briefly to FIG. 6 this figure is a schematic of a particular embodiment of the intermediate condenser 14 with air flowing inside the tubes and gas containing $SO_3$ outside the tubes in downward flow. Gas 13 from the first $SO_2$-conversion step enters at the top of the condenser and leaves as exit gas 16 at the bottom under the production of condensed sulphuric acid 17. Cooling air 33 from the air recycling loop enters at the bottom, is heated by passage inside glass tubes 14a and leaves at the top as air stream 34.

The strength of the acid withdrawn from the intermediate condenser depends on following three parameters:

The nominal $H_2O/SO_3$ ratio $\Psi$ of the inlet gas to the intermediate condenser, as defined above, the temperature in line 16 to which the gas plus condensate is cooled in the intermediate condenser, and the nominal partial pressure of $SO_3$ of the said inlet gas, calculated by assuming that all $H_2SO_4$ is dissociated in $H_2O+SO_3$. The correlation with nominal 12% $SO_3$ in gas at 1.1 atm. abs. pressure in Table 1 covers the range of operating conditions and concentrations of the condensed sulphuric acid and oleum relevant for the practical use of the process. At $\Psi$=1.06, the concentration of the condensate is constant at the azeotropic concentration of 99.09% $H_2SO_4$, independently of the temperature. At $\Psi$>1.06, the acid strength decreases with increasing $\Psi$ and decreasing temperature, while at a $\Psi$<1.06, acid strength decreases with increasing temperature. At $\Psi$=1.5, 94% concentrated sulphuric acid is condensed at 180° C. condenser outlet temperature. The process has in principle no upper limit with regard to $\Psi$ but a practical upper limit of $\Psi$ is probably about 1.6, corresponding to 93-93.5% strength of the condensed sulphuric acid.

Normally 0.5-1% of the condensed acid or oleum will condense as aerosol (sub-micron droplets) passing to the second $SO_2$-conversion step of the process. We have found that the formation of such aerosol increases strongly when the difference between the $H_2SO_4$ dew point and the temperature of the cooling air is increased beyond 20-30° C. in the upper part of the intermediate condenser.

In the production of oleum, it is seen in Table 1 that the gas must be cooled to much lower temperatures than with the production of sulphuric acid in order to achieve sufficient absorption of $SO_3$ in the sulphuric acid. Hence, in the production of oleum with 25% $SO_3$, the gas and condensate must be cooled to 40° C. This is accomplished most advantageously as seen in FIG. 3, by final cooling of the gas and the condensed acid in a water cooled heat exchanger placed in the space below the lower tube sheet of the air cooled glass tubes. The cooling is further facilitated by entirely replacing air supply from the final condenser with ambient air being supplied to the air loop by passing the ambient air inside the intermediate condenser as seen in FIG. 3.

The amount of water added to the air recycling loop in the humidifier 31 is adjusted so that (1) the content of $H_2O$ in the air withdrawn from the air recycling loop for preparation of the feed gas gives the desired value of $\Psi$ of the gas being passed to the intermediate condenser, and (2) the amount of water necessary for obtaining minimum 1.6% $H_2O$ in the gas withdrawn from the final condenser is supplied with the air from the loop being supplied to the gas withdrawn from the intermediate condenser and passed to the second $SO_2$ conversion step of the process. In particular the amount of water added to the gas stream withdrawn from the intermediate condenser according to step (e) corresponds to a clean gas withdrawn from the final condenser containing 2-2.5 vol % $H_2O$.

Two important benefits are achieved by evaporating water into the air recycling loop of the process of the invention:

Firstly, the heat of evaporating the water is supplied from cooling of the inlet air to the intermediate condenser to typically about 70° C. thereby decreasing the duty and allowing higher air exit temperature of the air coolers which is used for the preheating of boiler feed water and, therefore, are bottle necks in maximum utilization of the heat of the process in the steam cycle of power production. Secondly, a high content of $H_2O$ in air decreases the specific weight and increases the heat capacity and conductivity of the air, thereby increasing the heat transfer coefficient and decreasing the pressure drop on the air side of the glass tubes of the condenser.

Addition of $H_2O$ in the production of the feed gas is usually not desirable when the feed gas originates from combustion of $H_2S$-gas containing additional hydrogen compounds, which give $\Psi$-values above 1.1-1.15 without adding further $H_2O$ to the combustion air in the feed gas production section. In such cases, no water can be added to the cooling air recirculation loop, if hot air withdrawn from the loop is used as combustion air in the preparation of the $SO_2$-gas. Alternatively, as seen in FIG. 5, only hot air withdrawn directly from the final condenser is used instead for the production of the feed gas. Only air in line 36 for the final $SO_2$ conversion step is still withdrawn from the air recycling loop of the intermediate condenser. Still, the air in the loop of the intermediate condenser is kept highly enriched in $H_2O$ in the process of the invention for two reasons: in order to supply the additional $H_2O$ required for the second $SO_2$-conversion step of the process and in order to increase the heat capacity and decrease the specific weight of the cooling air, as seen in FIG. 5, where 25% $H_2O$ in the recycling air decreases the pressure drop of the recycle loop by 25% compared to a situation with 2% $H_2O$ in the air. The intermediate condenser exit gas in line 16 is heated in 18 and additional air with excess $H_2O$ added to the gas upstream of a second $SO_2$ conversion step in the catalytic converter or catalytic section 20 followed by cooling of the gas in the gas cooler 22 and condensation of remaining $SO_3$ and $H_2SO_4$ in the final sulphuric acid condenser 24 with the gas flowing upwards in air cooled glass tubes in accordance with known technology.

TABLE 1

Intermediate condenser operating conditions

| $H_2O/SO_3$ ratio, $\Psi$ | Acid dew pt. of condenser inlet gas, ° C. | Condenser outlet temp. $T_{16}$, ° C. | Fraction of $SO_3 + H_2SO_4$ Condensed | Strength of condensate | Vol % in exit gas (16) $SO_3 + H_2SO_4$ | $H_2O$ |
|---|---|---|---|---|---|---|
| 1.0 | 278.4 | 120 | 99.5% | 99.90% $H_2SO_4$ | 0.084 | 0.000 |
| 1.0 | 278.4 | 140 | 98.7% | 99.80% $H_2SO_4$ | 0.200 | 0.000 |
| 1.05 | 279.3 | <50 | 100% | 99.09% $H_2SO_4$ | 0 | 0 |
| 1.05 | 279.3 | 120 | 99.9% | 99.09% $H_2SO_4$ | 0.0145 | 0.003 |
| 1.05 | 279.3 | 140 | 99.7% | 99.09% $H_2SO_4$ | 0.051 | 0.018 |
| 1.05 | 279.3 | 160 | 99.0% | 99.07% $H_2SO_4$ | 0.163 | 0.032 |
| 1.10 | 280.2 | 120 | 99.9% | 98.22% $H_2SO_4$ | 0.013 | 0.025 |
| 1.10 | 280.2 | 140 | 99.8% | 98.25% $H_2SO_4$ | 0.030 | 0.053 |
| 1.10 | 280.2 | 160 | 99.4% | 98.32% $H_2SO_4$ | 0.097 | 0.134 |
| 1.10 | 280.2 | 180 | 98.1% | 98.45% $H_2SO_4$ | 0.31 | 0.307 |
| 1.20 | 281.7 | 120 | | | | |
| 1.20 | 281.7 | 140 | 99.86% | 96.62% $H_2SO_4$ | 0.0233 | 0.164 |
| 1.20 | 281.7 | 160 | 99.56% | 96.85% $H_2SO_4$ | 0.0713 | 0.39 |
| 1.30 | 283.1 | 140 | | 95.05% $H_2SO_4$ | 0.021 | 0.315 |
| 1.30 | 283.1 | 160 | 99.6% | 95.50% $H_2SO_4$ | 0.063 | 0.687 |
| 1.30 | 283.1 | 180 | 99.0% | 96.06% $H_2SO_4$ | 0.167 | 1.31 |
| 1.40 | 284.4 | 140 | 99.9% | 93.62% $H_2SO_4$ | 0.017 | 0.526 |
| 1.40 | 284.4 | 160 | 99.7% | 94.2% $H_2SO_4$ | 0.052 | 1.099 |
| 1.40 | 284.2 | 180 | 99.1% | 95.0% $H_2SO_4$ | 0.142 | 1.916 |
| 1.50 | | 160 | 99.7% | 93.0% $H_2SO_4$ | 0.051 | 1.555 |
| 1.50 | | 180 | 99.2% | 94.05% $H_2SO_4$ | 0.131 | 2.65 |
| 0.80 | 273.9 | 40 | 96.0% | 14.0% $SO_3$ | 0.61 | 0 |
| 0.80 | 273.9 | 60 | 92.1% | 11.0% $SO_3$ | 1.2 | 0 |
| 0.70 | 271.3 | 20 | 97.3% | 24.2% $SO_3$ | 0.4 | 0 |
| 0.70 | 271.3 | 40 | 94.0% | 21.85% $SO_3$ | 0.9 | 0 |
| 0.70 | 271.3 | 60 | 86.5% | 16.1% $SO_3$ | 2 | 0 |
| 0.60 | 268.2 | 20 | 95 | 32% $SO_3$ | 0.7 | 0 |
| 0.60 | 262.2 | 40 | 88 | 27.8% $SO_3$ | 1.7 | 0 |

12% nominal $SO_3$ concentration inlet condenser. 1.1 atm absolute pressure

EXAMPLE 1

FIG. 2 shows the process of the invention applied for production of 31 t/h of 98.5% $H_2SO_4$ from combustion of 10 ton/h of sulphur with 62,000 $Nm^3$/h air with 11.8% $H_2O$ giving 11.3% $SO_2$+11.8% $H_2O$ in the feed gas in line 10. The marked region 1 represents the feed gas production section. The total $SO_2$-conversion is >99.9%. In the first step of the process, 96.31% of the $SO_2$ is converted to $SO_3$ practically all of which is withdrawn as 98.5% $H_2SO_4$ from the intermediate condenser. Ψ is chosen to 1.086 yielding 98.5% $H_2SO_4$ as the condensate from the intermediate condenser in which the gas is cooled to 150° C. ($T_{16}$ in line 16). If Ψ is decreased to, say, 1.05, the strength of the condensed acid increases to 99.0%, as seen in Table 1. Possible carry over to the second step of the process of about 1000 ppm $H_2SO_4$ mist not being removed in the droplet arrester 16a seen in line 16 does not change the operating data significantly and would have only the effect that 200 kg/h 98.5% $H_2SO_4$ would be moved from the acid stream withdrawn from the intermediate condenser to the acid being withdrawn from the final condenser.

Heat recovery efficiency and steam production is summarized in Table 2 with reference to FIG. 2. About 94% of the heat produced in the process is recovered for steam generation while 6% of the heat is lost to cooling water for the acid coolers in line 17 and 42 (see also numeral references in FIG. 1) and in the stack gas leaving the final condenser at 100° C. in line 26. It is seen that the heat recovered in the air coolers 38 and 28 (see numeral references in FIG. 1) can be fully accommodated for preheating of the boiler feed water (BFW) for generation of high pressure, superheated steam for maximum power generation at BFW inlet temperatures down to about 50° C. with reasonable size of the heat exchangers.

TABLE 2

Heat recovery efficiency of process according to FIG. 2

| Heat balances and heat recovery, referring to FIG. 2 and 35° C. reference temperature of all feed and effluent streams | kcal/kg s | kWh/kg $H_2SO_4$ |
|---|---|---|
| Total heat generated before correction for losses | 4.065 | 1.545 |
| Heat loss in acid coolers and stack gas | 248 | 0.943 |
| Net recovered for steam production after deduction of other losses | 3.750 | 1.42 |

Steam at 80 bar, 500° C. generated from BFW at 45° C.: 4.9 kg steam/kg S = 1.60 kg/kg $H_2SO_4$
BFW preheat in air coolers 38 + 28: ΔT of BFW = (7.35 + 1.08)10^6/(49,000 * 1.015) = 170° C.

Whenever sulphuric acid with <100% $H_2SO_4$ is condensed in the intermediate condenser in the process of the invention, the exit temperature $T_{16}$ in line 16 of the intermediate condenser is chosen as a compromise between a number of other considerations:

decreasing $T_{16}$ will (a) increase the amount of low temperature heat to be recovered in the air cooler 38, (b) decrease the content of gas phase $H_2SO_4$ and $SO_3$ being passed to the second $SO_2$ conversion step of the process and (c) increase the required size (heat exchange capacity) of both the intermediate condenser, the air cooler 38 and the gas heater 18. When the gas is cooled below 140° C., the content of $H_2SO_4$+$SO_3$ in the gas will not decrease further and will even tend to increase due to increased tendency to mist formation at lower temperatures. Consequently, we find that with the $H_2O/SO_3$ molar ratio in the range 1.05-1.1 calculated under the assumption that $SO_3$ is not hydrated to $H_2SO_4$ upstream the intermediate condenser, cooling of the gas in the intermediate condenser $T_{16}$ to 150° C. is the best solution and can easily be achieved with BFW inlet temperatures up to 50° C.

The quench cooling by 50° C. in FIG. 2 of the cooling air by evaporation of all process water in the water evaporator 31 (humidifier) is obviously also necessary for achieving the high energy efficiency of the process.

More specifically, in the process of FIG. 2 10,000 kg/h of sulphur 1a (130° C., liq.) are combusted in burner 1e at about 1200° C. Air 1b at 270° C. and with 11.8% $H_2O$ is provided to feed gas production section 1 from the air recycling loop. The air passes through blower 1d to produce air line 1c at 280° C. which is added to burner 1e. The feed gas 10 is conducted at 400° C. to $SO_2$-converter 11 where it passes through a number of catalytic beds with interbed cooling. The $SO_3$-containing gas is cooled in the heat exchanger 12 upstream of the intermediate condenser 14 to a temperature of 310° C., which is above the $H_2SO_4$ dew point ($T_d$) of the gas here specifically $T_d$=278° C. The exit gas leaves at 150° C. at the bottom of intermediate condenser 14 as line 16 while a stream of 29,800 kg/h 98.5% $H_2SO_4$ is withdrawn as line 17. The gas leaving at the bottom of the intermediate condenser is mixed with 13,000 Nm3/h air 36 at 270° C. from the air recycling loop, thus heating line 16 to 178° C. prior to passage to heat exchanger 18. The gas then enters at 390° C. and is further converted to $SO_3$ in a final catalyst bed of second $SO_2$ conversion step 20. The exit gas, now at 404° C., is cooled via heat exchanger 22 to give process gas line 23 at 235° C. and $T_d$=202° C. (acid dew point) which enters at the bottom of final condenser 24 and leaves as clean gas 26 at the top. An air intake of about 57,000 Nm3/h at 25° C. and with 2% $H_2O$ is conducted via blower 25 to the top of the final condenser 24 where air enters at about 30° C. while a clean gas 26 leaves at about 100° C. A product stream of about 1200 kg/h 97.5% H2SO4 is withdrawn as line 42 at the bottom of final condenser 14 and is then mixed with H2SO4 stream 17 to produce a final stream at 35° C. of about 31,000 kg/h of 98.5% H2SO4. Air 27 from the final condenser 24 is withdrawn at the bottom of this condenser at 190° C., cooled in heat exchanger 28 and enters subsequently in the air recycling loop. The air is then quench cooled to 82° C. by passage through water evaporator 31. All process water, here specifically about 6000 kg/h of water at 30° C. is added to the evaporator. Additional air is provided through air intake 35, introducing about 10,500 Nm3/h of air at 35° C. and 2% H2O. The resulting cooling air 33 of the loop, now at 80° C., is introduced to the bottom of intermediate condenser 14. The air is heated through its passage through the condenser and leaves as stream 34 at the top at 270° C. A portion of this stream, specifically 62,000 Nm3/h containing 11.8% H2O is directed to feed gas preparation section 1 and used as combustion air as described above. In the air recycling loop, a major portion of 162,000 Nm3/h of the air withdrawn from the top of the intermediate condenser 14 at 270° C. is cooled to 130° C. in heat exchanger 38 and is then directed to blower 39 where it is mixed with cooled air from the final condenser 24. The air now at 134.5° C. is further cooled in evaporator 31 of the air recycling loop. Table 3 shows details on process gas streams 10, 13, 16, 26.

TABLE 3

Material balance FIG. 2.

| | Process gas stream | | | |
|---|---|---|---|---|
| | 10 | 13 | 16 | 26 |
| $O_2$ mol % | 7.221 | 1.95 | 2.473 | 5.94 |
| $H_2O$ mol % | 11.800 | 9.37 | 0.069 | 2.23 |
| $SO_2$ mol % | 11.276 | 0.455 | 0.578 | 0.010 |
| $SO_3$ mol % | — | 8.34 | 0.009 | — |
| $H_2SO_4$ mol % | — | 3.55 | 0.054 | 0.02 |
| Flow, $Nm^3/h$ | 62,000 | 56,624 | 44,643 | |
| $H_2SO_4$ aerosol, $g/Nm^3$ | | | 4.37 | 0.005 |

$H_2O/SO_3$ ratio, $\Psi = 1.0866$

EXAMPLE 2

FIG. 3 shows the process of the invention embodied for production of oleum from combustion of the same amount of sulphur and oxygen as in Example 1, and with slight lower $SO_2$-conversion in the first $SO_2$ conversion step (due to a lower content of $H_2O$ in the gas). The amount of water evaporated in 31 is reduced from 6028 kg/h in Example 1 to 2871 kg/h water in order to obtain $\Psi=0.659$ which means that 65.9% of the $SO_3$ in the gas is converted to $H_2SO_4$ practically all of which will be condensed at 140° C. However, substantial absorption of the SO3 in the condensed $H_2SO_4$ requires much lower temperatures. Hence, the gas and the condensed $H_2SO_4$ is further cooled to 40° C. in order to absorb 80% of the free $SO_3$ in the $H_2SO_4$ yielding oleum with 24.5-25 wt % $SO_3$ being withdrawn from the intermediate condenser. This cooling is best achieved in two steps as seen in FIG. 3:

First, all $H_2SO_4$ is condensed and the gas is cooled to about 100° C. in the air cooled glass tubes. In order to obtain maximum cooling efficiency with air, all the air which is added to the air recycling loop is taken in as ambient air in line 32 while all the cooling air from the final absorber is vented in line 40 after heat recovery in the air cooler 28. In order to utilize in the best possible manner the relative low temperature of the ambient air (35° C. after compression) for cooling in the condenser, this air stream is used separately for final cooling of the gas and is entered directly into the intermediate condenser in typically two cross flow passes above the lower tube sheet of the glass tube section of the condenser before being admixed with additional air from the air recycling loop.

Then the gas and acid is finally cooled to 40° C. and SO3 absorbed in the acid by cooling the gas and acid with cooling water in e.g. a tubular or plate type heat exchanger 51 placed below the lower tube sheet of the air cooled glass tubes. The cooling water is conveniently being heated from inlet temperature about 20° C. to outlet temperature in the range 40-50° C. The heat exchanger can be made in low alloy steel. Compared to Example 1, the heat recovery efficiency will be lower due to the loss to cooling water of the heat of absorption of $SO_3$ in $H_2SO_4$ and cooling of the gas from 100 to 40° C., and due to the loss of remaining heat in the cooling air from the final absorber now being vented to the atmosphere.

More specifically, in the process of FIG. 3 10,000 kg/h of sulphur 1a (130° C., liq.) are combusted in burner 1e at about 1200° C. Air 1b at 266° C. and with 7.47% $H_2O$ is provided to feed gas production section 1 from the air recycling loop. The air passes through blower 1d to produce air line 1c which is added to burner 1e. The feed gas 10 is conducted at 400° C. to $SO_2$-converter 11 where it passes through a number of catalytic beds with interbed cooling. The $SO_3$-containing gas is cooled in the heat exchanger 12 upstream of the intermediate condenser 14 to a temperature of 305° C., which is above the $H_2SO_4$ dew point ($T_d$) of the gas, here $T_d$=274° C. The process gas is first cooled to 100° C. in the air cooled glass tubes of intermediate condenser 14. The gas and acid is finally cooled to 40° C. and SO3 absorbed in the acid by cooling the gas and acid with cooling water in e.g. a tubular or plate type heat exchanger 51 placed below the lower tube sheet of the air cooled glass tubes of the intermediate condenser 14. About 2900 kg/h of cooling water 27 at inlet temperature of 20-40° C. is used. The heat exchanger can be made in low alloy steel.

At the bottom of intermediate condenser 14 exit gas is withdrawn as line 16 while a stream of about 25,500 kg/h oleum with 25% SO3 is withdrawn as line 17. The gas leaving at the bottom of the condenser 14 is mixed with 5,000 Nm3/h air 36 at 266° C. from the air recycling loop, thus heating line 16 prior to addition of 1200 kg/h steam at 250° C. and 1.4 atm of pressure to this line and subsequent passage to heat exchanger 18. The gas then enters at 390° C. and is further converted to $SO_3$ in a final catalyst bed of second $SO_2$ conversion step 20. The exit gas now at 406° C. is cooled via heat exchanger 22 to give process gas line 23 at 250° C. which enters at the bottom of final condenser 24. An air intake of about 64,000 Nm3/h at 25° C. and with 2% H2O is conducted via blower 25 to the top of the final condenser 24 where air enters at about 30° C. while a clean gas 26 leaves at about 100° C. A product stream of about 3700 kg/h 98.2% H2SO4 is withdrawn as line 42 at the bottom of final condenser 24. Air 27 from the final condenser 24 is withdrawn at the bottom at 200° C., cooled in heat exchanger 28 and vented to atmosphere as line 40.

Air needed in the air recycling loop is provided by a blower adapted to air intake 35, thereby introducing about 60,500 Nm3/h of air at 25° C. and 2% H2O. This air stream 32 now at 32° C., is introduced to the bottom of intermediate condenser 14. As described above the air 32 is entered directly into the intermediate condenser 14 in two cross flow passes above the lower tube sheet of the glass tube section of the condenser before being admixed with additional air 33 from the air recycling loop. The air is heated through its passage through the condenser and the combined air leaves at the top at 266° C. A portion of this stream, specifically 59,000 Nm3/h containing 7.47% H2O is directed to feed gas preparation section 1 and used as combustion air. A major portion of 140,000 Nm3/h of the air withdrawn from the top of the intermediate condenser 14 at 266° C. is cooled in heat exchanger 38 and directed to blower 39 and then humidified and further cooled to 77° C. by addition of about 2900 kg/h of water at 40° C. via evaporator 31. Table 4 shows details on process gas streams 10, 13, 16, 26.

TABLE 4

Material balance FIG. 3.

| | Process gas stream | | | |
|---|---|---|---|---|
| | 10 | 13 | 16 | 26 |
| $O_2$ mol % | 7.57 | 2.07 | 2.486 | 3.93 |
| $H_2O$ mol % | 7.47 | 5.41 | 0 | 2.00 |
| $SO_2$ mol % | 11.83 | 0.535 | 0.643 | 0.0405 |
| $SO_3$ mol % | — | 9.62 | 1.099 | — |
| $H_2SO_4$ mol % | — | 2.725 | 0 | 5 ppm |

TABLE 4-continued

Material balance FIG. 3.

| | Process gas stream | | | |
|---|---|---|---|---|
| | 10 | 13 | 16 | 26 |
| Flow, Nm³/h | 59,096 | 54,267 | 45,128 | |
| $H_2SO_4$ aerosol, g/Nm³ | | | 1.5 | 0.005 |

$H_2O/SO_3$ ratio, $\Psi = 0.659$

EXAMPLE 3

This example concerns the treatment of gas streams from wet scrubbing with up 70 vol % $SO_2$. Such gas streams originate from metallurgical roasting processes or from thermal regeneration of spent sulphuric acid or sulphates and are purified by wet scrubbing before being fed to any process for production of sulphuric acid.

FIG. 4 shows the process of the invention for treatment of an original gas stream of 20,507 Nm³/h in line 2 entering the feed gas production section 1 with 34.09% $SO_2$, 1.42% $O_2$ and 7.66% $H_2O$ (saturated at 40° C., –50 mbar, equivalent t 1000 kg/h sulphur) of scrubbed $SO_2$ gas from oxygen enriched roasting of metal sulphides. The gas, which corresponds to 10,000 kg sulphur/h, is mixed with line 35 containing 25,482 Nm³/h hot air with 21.38% $H_2O$ withdrawn from the air recycling loop of the intermediate condenser comprising the amount $O_2$ and $H_2O$ required for the first $SO_2$ conversion step of the process. After heating the gas stream to 400° C. with superheated steam produced in the process, the inlet feed gas 10 now with 15.2 vol % $SO_2$, 9.76% $O_2$ and 15.26% $H_2O$ is passed to the first $SO_2$ conversion step of the process comprising three catalytic beds where 95.0% of the $SO_2$ is converted to $SO_3$ with $\Psi=1.056$. All the air for the process is supplied as cooling air from the final condenser; excess air is vented to the atmosphere through 40.

More specifically, in the process of FIG. 4 the $SO_3$-containing gas from the first SO2-conversion step 11 is cooled in heat exchanger 12 upstream of the intermediate condenser 14 to a temperature of 318° C., which is above the $H_2SO_4$ dew point ($T_d$) of the gas (line 13) here specifically $T_d=289°$ C. The exit gas leaves at 150° C. at the bottom of intermediate condenser 14 as line 16 while a stream of 29,100 kg/h 98.95% $H_2SO_4$ is withdrawn as line 17. The gas leaving at the bottom of the intermediate condenser is mixed with 5,000 Nm³/h air 36 from the air recycling loop, thus heating line 16 prior to passage to heat exchanger 18. The gas then enters at 390° C. and is further converted to $SO_3$ in a final catalyst bed of second $SO_2$ conversion step 20. The exit gas, now at 424° C., is cooled via heat exchanger 22 to give process gas line 23 at 242° C. which enters at the bottom of final condenser 24 and leaves as clean gas 26 at 95° C. at the top. An air intake of about 40,300 Nm3/h at 25° C. and with 2% H2O is conducted via blower 25 to the top of the final condenser 24 where air enters at about 35° C. A product stream of about 1750 kg/h 98% H2SO4 is withdrawn as line 42 at the bottom of final condenser 14 and is then mixed with H2SO4 stream 17 to produce a final stream of about 30,850 kg/h of 98.90% H2SO4. Air 27 from the final condenser 24 is withdrawn at the bottom of this condenser at 195° C. and cooled in heat exchanger 28. A portion of the air (15,840 Nm3/h) is vented as exhaust air in line 40 while the rest of the air enters in the air recycling loop. The air is then quench cooled from 118° C. to 67° C. thus forming line 33 containing about 181,200 Nm3/h air. The quench is provided by the passage of the air through water evaporator 31, where about 4800 kg/h of water at 25° C. is added to the evaporator. The cooling air 33 of the loop, now at 67° C., is introduced to the bottom of intermediate condenser 14. The air is heated through its passage through the condenser and leaves as stream 34 at the top of this condenser. A portion of this stream containing 21.38% H2O is directed to feed gas preparation section 1 as described above. In the air recycling loop, a major portion of the air withdrawn from the top of the intermediate condenser 14 is cooled in heat exchanger 38 and is then directed to blower 39 where it is mixed with cooled air from the final condenser 24. The air now is further cooled in evaporator 31 of the air recycling loop. Table 5 shows details on process gas streams 10, 13, 16, 26.

TABLE 5

Material balance FIG. 4.

| | Process gas stream | | | | | |
|---|---|---|---|---|---|---|
| | 2 | 10 | 13 | 16 | 19 | 26 |
| $O_2$ mol % | 1.421 | 9.76 | 2.87 | 4.025 | 5.84 | 5.51 |
| $H_2O$ mol % | 7.661 | 15.26 | 12.42 | 0.034 | 3.30 | 2.07 |
| $SO_2$ mol % | 34.09 | 15.20 | 0.86 | 1.202 | 1.02 | 0.033 |
| $SO_3$ mol % | — | — | 11.50 | 0.021 | 0.16 | — |
| $H_2SO_4$ mol % | — | — | 4.82 | 0.165 | 0.002 | 5 ppm |
| N2 + CO2 mol % | 56.815 | 59.81 | 61.09 | 94.65 | 89.68 | 92.78 |
| Flow, Nm³/h | 20,507 | 45,989 | 40,705 | 29,041 | 34,118 | 33,122 |

$H_2O/SO_3$ ratio, $\Psi = 1.056$

EXAMPLE 4

This example concerns the treatment of feed gas from combustion of 7768 Nm³/h gas with 90% $H_2S+10\%$ $H_2O$ with 75,000 Nm³/h air with 2% $H_2O$ (without addition of $H_2O$ since the feed gas cannot accommodate more $H_2O$) from the final condenser, as seen in FIG. 5. After obtaining 97.5% $SO_2$-conversion in the first $SO_2$ conversion step of a feed gas 10 with 8.82 vol % $SO_2$, 6.2% $O_2$, 11.69% $H_2O$, the converted gas with $\Psi=1.367$ is passed to the intermediate condenser. Ambient air from cooling of the final condenser is used for the combustion and the preparation of the feed gas in order to keep $\Psi$ high and obtain highest possible strength of the sulphuric acid condensed in the intermediate condenser, while the air of the air recycling loop is humidified as much as possible in order to improve the properties of the air for heat transfer and to supply $H_2O$ to the second $SO_2$-conversion step of the process. Since the conversion of $SO_2$ to $SO_3$ in the first $SO_2$ conversion step (three catalytic beds) is 97.0%, the nominal $H_2O/SO_3$ molar ratio of the gas passed to the intermediate condenser is $\Psi=11.69/8.82/0.97=1.366$. In the intermediate condenser the gas is cooled from 305° C. to 180° C. by circulating air being humidified with 25% $H_2O$ thereby increasing the efficiency of the condenser. This humidification is achieved by evaporating 603 kg/h water in humidifier or evaporator 31, corresponding to the amount of $H_2O$ in the 3000 $Nm^3/h$ air 36 withdrawn from the loop and added to the gas 16 being passed to the second $SO_2$-conversion step of the process. Cooling to 180° C. is chosen as a compromise between achieving 95.8% strength of the condensed acid, and keeping low the operating costs and condenser and heat exchanger investment costs.

More specifically, in the process of FIG. 5 the $SO_3$-containing gas from the first SO2-conversion step 11 is cooled in heat exchanger 12 upstream of the intermediate condenser 14 to a temperature of 305° C., which is above the $H_2SO_4$ dew point ($T_d$) of the gas (line 13) here specifically $T_d=272°$ C. The exit gas leaves at 180° C. at the bottom of intermediate condenser 14 as line 16 while a stream of 30,500 kg/h 95.82% $H_2SO_4$ is withdrawn as line 17. The gas leaving at the bottom of the intermediate condenser is mixed with air 36 from the air recycling loop as described above, thus heating line 16 prior to passage to heat exchanger 18. The gas then enters at 390° C. and is further converted to $SO_3$ in a final catalyst bed of second $SO_2$ conversion step 20. The exit gas 21, now at 400° C., is cooled via heat exchanger 22 to give process gas line 23 at 235° C. which enters at the bottom of final condenser 24 and leaves as clean gas 26 at 100° C. at the top. An air intake of 61,750 Nm3/h at 25° C. and with 2% H2O is conducted via blower 25 to the top of the final condenser 24. A product stream of about 1350 kg/h 97.5% H2SO4 is withdrawn as line 42 at the bottom of final condenser 14 and is then mixed with H2SO4 stream 17 to produce a final stream at 35° C. of 31,850 kg/h of 95.95% H2SO4.

Air 27 from the final condenser 24 is withdrawn at the bottom of this condenser at 190° C. and directly conducted to the burner in feed gas preparation section 1. An air intake of 13,250 Nm3/h is admixed in line 27 prior to being used in the burner.

Air needed in the air recycling loop is added via air intake 35, thereby introducing about 2300 Nm3/h of air. A combined air stream 33 at 90° C. results which are then introduced to the bottom of intermediate condenser 14. As described above the air 32 is entered directly into the intermediate condenser 14. The air is heated through its passage through the condenser and the combined air leaves at the top at 260° C. A portion of this air is cooled in heat exchanger 38 and directed to blower 39 thereby resulting in an air stream at 96° C. which is then humidified and further cooled by addition of about 603 kg/h of water at 40° C. via evaporator 31. Table 6 shows details on process gas streams 10, 13, 16, 26.

TABLE 6

Material balance FIG. 5.

| | Process gas stream | | | |
|---|---|---|---|---|
| | 10 | 16 | 19 | 26 |
| $O_2$ mol % | 6.20 | 2.51 | 3.13 | 3.00 |
| $H_2O$ mol % | 11.69 | 1.485 | 2.74 | 2.23 |
| $SO_2$ mol % | 8.82 | 0.342 | 0.325 | 0.013 |
| $SO_3$ mol % | — | 0.007 | 0.157 | — |
| $H_2SO_4$ mol % | — | 0.16 | 0.002 | 4 ppm |
| N2 mol % | 73.29 | | 93.65 | |
| Flow, $Nm^3/h$ | 79,273 | 60,841 | 63,931 | 63,187 |

$H_2O/SO_3$ ratio, $\Psi = 1.367$

It is therefore shown that the invention provides an improved double condensation process for recovery of up to 99.95% of the $SO_x$ in the feed gases in which the $SO_x$ content is above 5 vol % and $H_2O/SO_x$ ratios are in the range 0.6-1.6. The $SO_x$ is recovered as sulphuric acid of concentrations ranging from oleum with 25-30 wt % $SO_3$ to acid with at least 95 wt %, normally above 98 wt % $H_2SO_4$ depending on the H2O/SO3 molar ratio. There is maximum recovery of all process heat for steam and power production with minimal risk of corrosion of the sulphuric acid condensers.

In other words, the process of the invention minimizes power consumption of the sulphuric acid plant by reducing the consumption of cooling water and obtaining maximum possible recovery of the heat liberated in the process for production of high pressure steam for power production. Up to 99.95% of the $SO_x$ in the feed gas can be recovered as typically 98.5-99.5 wt % concentrated sulphuric acid and/or oleum with up to 25 wt % $SO_3$.

The process of the invention has in principle no lower or upper limit with regard to the nominal $SO_3$ concentration in the process gas or the $SO_2$ concentration in the feed gas, except that $SO_2$-concentrations above 16-17% $SO_2$ in the feed gas require internal cooling or gas recirculation in order to avoid overheating of the catalyst. On the lower end, the process is preferably conducted with feed gases containing at least about 5 vol % $SO_2$.

What is claimed is:

1. Process for the production of sulphuric acid and/or oleum comprising the steps of:
   (a) producing a feed gas containing 5-50 mol % of $SO_2$ and a molar concentration of $H_2O$ being 50-150% of the molar concentration of $SO_2$;
   (b) passing the feed gas through a first $SO_2$-conversion step in which $SO_2$ is oxidized to $SO_3$ in one or more catalyst beds;
   (c) cooling the $SO_3$-containing gas from said first $SO_2$-conversion step to a temperature 0-100° C. above the sulphuric acid dew point of the gas;
   (d) passing the gas to an intermediate sulphuric acid condensing stage wherein the $SO_3$-containing gas is cooled and sulphuric acid is condensed in air cooled tubes in which the $SO_3$-gas flows downwards while the cooling air flows counter currently upwards the intermediate condenser and in which said air is provided from air recycling loop adapted to said intermediate condenser, and withdrawing from the bottom of the intermediate condenser a stream of condensed sulphuric acid or oleum, and a gas stream containing unconverted $SO_2$ and uncondensed $SO_3$ and $H_2SO_4$;
   (e) providing water and oxygen to the gas stream from the intermediate condenser containing unconverted $SO_2$ and uncondensed $SO_3$ and $H_2SO_4$ by adding to this gas stream air withdrawn from said air recycling loop, in which the air recycling loop comprises:
      (e1) cooling of the air, (e2) adding water to the air by evaporating water in a humidifier,
(e3) providing air to the air recycling loop;
(e4) heating the air of step (e2) and (e3) by passing the air through the intermediate condenser,
(e5) withdrawing a portion of air which has been heated according to step (e4) and adding this air to said gas stream from the intermediate condenser containing unconverted $SO_2$ and uncondensed $SO_3$ and $H_2SO_4$;
(f) reheating the resulting gas stream from step (e) and passing this gas to a second $SO_2$-conversion step in which remaining $SO_2$ is oxidized to $SO_3$ in one or more catalyst beds, cooling the gas to a temperature 0-100° C. above its $H_2SO_4$ dew point and subsequently passing the gas to a final condensing stage in which the remaining sulphuric acid is condensed by cooling of said gas in a final condenser containing air-cooled vertical glass tubes in which the gas flows upwards while the air flows counter-currently downwards, and withdrawing from said final condenser a stream of sulphuric acid;
(g) providing in the gas, prior to or after its cooling to a temperature 0-100° C. above its $H_2SO_4$ dew point according to step (f), a content of $10^{10}$ to $10^{13}$ solid particles per $Nm^3$ per vol % $SO_3$, calculated under the assumption that $SO_3$ is not hydrated to $H_2SO_4$.

2. Process according to claim 1, wherein in the intermediate condensing stage of step (d) the $SO_3$-containing gas is cooled by: i) passing the gas through vertical, air cooled glass tubes in which the $SO_3$-gas flows inside the tubes while the cooling air flows counter currently upwards on the shell side of the intermediate condenser, or ii) passing the gas on the outside of horizontal glass tubes in counter-current cross-flow with air passing inside said tubes.

3. Process according to claim 2, wherein the vertical, air cooled glass tubes are equipped with inside glass spirals.

4. Process according to claim 1, wherein the production of the feed gas of step (a) comprises withdrawing from the air recycling loop of the intermediate condenser a stream of hot air containing water and contacting this stream with a sulphur containing stream, in which said sulphur containing stream is selected from a feedstock containing elementary sulphur, and a flue gas obtained from the scrubbing of $SO_2$ containing gas originating from the roasting of metal sulphides or from thermal regeneration of spent sulphuric acid and sulphates.

5. Process according to claim 1, wherein the sulphur containing stream used in the production of the feed gas of step (a) is a gas containing $H_2S$ which is subjected to combustion and in which the combustion air comprises air withdrawn from the final condensing stage.

6. Process according to claim 1, wherein the air recycling loop of the intermediate condenser under (e3) comprises adding cooled cooling air withdrawn from the final condenser upstream of the humidifier, and/or adding directly ambient air into the intermediate condenser or upstream of the intermediate condenser.

7. Process according to claim 1, wherein the gas resulting from step (c) upstream the intermediate sulphuric acid condenser is provided with a $H_2O/SO_3$ molar ratio in the range 1.0-1.15, calculated under the assumption that $SO_3$ is not hydrated to $H_2SO_4$.

8. Process according to claim 1, wherein the gas resulting from step (c) upstream the intermediate sulphuric acid condenser is provided with a $H_2O/SO_3$ ratio of 0.5-0.9, calculated under the assumption that $SO_3$ is not hydrated to $H_2SO_4$.

9. Process according to claim 5, wherein the gas resulting from step (c) upstream the intermediate sulphuric acid condenser is provided with a $H_2O/SO_3$ ratio in the range 1.15-1.50, calculated under the assumption that $SO_3$ is not hydrated to $H_2SO_4$ and without adding additional $H_2O$ to the gas in the preparation of the feed gas.

10. Process according to claim 1, wherein the upper tube sheet of the intermediate condenser is operated at temperatures above the sulphuric acid dew point of the inlet gas of at least 20° C.

11. Process according to claim 8, wherein the stream of gas and condensed sulphuric acid leaving the bottom end of the air cooled glass tubes of the intermediate condenser is further cooled by passing the stream of gas and condensate across a tube bundle placed downstream the glass tubes.

12. Process according to claim 1, wherein the feed gas of step (b) prior to passing through said first $SO_2$ conversion step contains 8-20 vol % $SO_2$ which is 94-98% converted to $SO_3$ over 2-4 catalyst beds, while the remaining $SO_2$ is about 90-99% or more converted to $SO_3$ over one catalyst bed in the second conversion step.

13. Process according to claim 7, wherein the gas stream containing unconverted $SO_2$ and uncondensed $SO_3$ and $H_2SO_4$ withdrawn at the bottom of the intermediate condenser has a temperature of 150° C.

* * * * *